United States Patent
Ben-Yair et al.

(10) Patent No.: US 11,188,667 B2
(45) Date of Patent: *Nov. 30, 2021

(54) MONITORING AND PREVENTING UNAUTHORIZED DATA ACCESS

(71) Applicant: International Business Machines Corporation, Armonk, NY (US)

(72) Inventors: Yoav Ben-Yair, Jerusalem (IL); Gil Fuchs, Jerusalem (IL); Itai Gordon, Jerusalem (IL); Ilan D. Prager, Beit Shemesh (IL)

(73) Assignee: International Business Machines Corporation, Armonk, NY (US)

( * ) Notice: Subject to any disclaimer, the term of this patent is extended or adjusted under 35 U.S.C. 154(b) by 207 days.

This patent is subject to a terminal disclaimer.

(21) Appl. No.: 16/555,488

(22) Filed: Aug. 29, 2019

(65) Prior Publication Data

US 2019/0384930 A1     Dec. 19, 2019

Related U.S. Application Data

(63) Continuation of application No. 15/798,145, filed on Oct. 30, 2017, now Pat. No. 10,579,814.

(51) Int. Cl.
*G06F 21/62*     (2013.01)
*G06F 21/60*     (2013.01)
(Continued)

(52) U.S. Cl.
CPC ........ *G06F 21/6218* (2013.01); *G06F 21/606* (2013.01); *G06F 21/6245* (2013.01);
(Continued)

(58) Field of Classification Search
CPC ............ G06F 21/6218; G06F 21/6245; G06F 21/606; G06F 21/6254; G06F 2221/2113;
(Continued)

(56) References Cited

U.S. PATENT DOCUMENTS 7,278,028 B1     10/2007   Hingoranee
8,448,246 B2      5/2013   Guerrero et al.
(Continued)

OTHER PUBLICATIONS

List of IBM Patents or Patent Applications Treated as Related, Sep. 12, 2019, pp. 1-2.

*Primary Examiner* — Darren B Schwartz
(74) *Attorney, Agent, or Firm* — Winstead PC

(57) ABSTRACT

A method, computer program product and system for preventing unauthorized access of confidential information. The transmission of data from a first user to a second user is detected. An authorization level corresponding to the second user is then determined. Furthermore, a probability that the authorization level corresponding to the second user and the data is accurate is generated. Additionally, a determination is made that the data includes sensitive information that the second user is not authorized to access based on the authorization level. Moreover, the data can be modified based on the probability, where the data is to be redacted if the probability is within a range of a threshold value or the data is to be blocked from transmission if the probability is above the range.

20 Claims, 5 Drawing Sheets

(51) Int. Cl.
  *G06N 7/00* (2006.01)
  *G06N 20/00* (2019.01)
  *H04L 29/06* (2006.01)

(52) U.S. Cl.
  CPC ........ *G06F 21/6254* (2013.01); *H04L 63/105* (2013.01); *G06F 2221/2113* (2013.01); *G06N 7/005* (2013.01)

(58) Field of Classification Search
  CPC ..... H04L 63/105; H04L 63/104; G06N 7/005; G06N 20/00
  See application file for complete search history.

(56) References Cited

U.S. PATENT DOCUMENTS

| | | | |
|---|---|---|---|
| 9,336,388 B2 | 5/2016 | Brdiczka et al. | |
| 9,525,692 B2 | 12/2016 | Gaudet et al. | |
| 9,836,662 B2* | 12/2017 | Ishii | G06F 21/32 |
| 2002/0120866 A1 | 8/2002 | Mitchell et al. | |
| 2002/0133586 A1 | 9/2002 | Shanklin et al. | |
| 2005/0108557 A1 | 5/2005 | Kayo et al. | |
| 2006/0259950 A1* | 11/2006 | Mattsson | H04L 63/1433 726/1 |
| 2007/0156693 A1 | 7/2007 | Soin et al. | |
| 2008/0071535 A1 | 3/2008 | Yoshioka et al. | |
| 2008/0098456 A1 | 4/2008 | Alward et al. | |
| 2008/0141339 A1 | 6/2008 | Gomez et al. | |
| 2010/0274815 A1 | 10/2010 | Vanasco | |
| 2011/0225650 A1 | 9/2011 | Margolies et al. | |
| 2012/0071151 A1* | 3/2012 | Abramson | H04W 64/006 455/418 |
| 2012/0216243 A1 | 8/2012 | Gill et al. | |
| 2012/0311696 A1 | 12/2012 | Datsenko et al. | |
| 2013/0060661 A1 | 3/2013 | Block et al. | |
| 2013/0117802 A1 | 5/2013 | Fendt | |
| 2013/0298203 A1 | 11/2013 | Ansari et al. | |
| 2014/0196104 A1 | 7/2014 | Chari et al. | |
| 2014/0222914 A1 | 8/2014 | Ebner et al. | |
| 2014/0230066 A1 | 8/2014 | Hurwitz et al. | |
| 2015/0067889 A1* | 3/2015 | Baikalov | G06F 21/577 726/28 |
| 2015/0227731 A1 | 8/2015 | Grigg et al. | |
| 2015/0237074 A1 | 8/2015 | Mardikar et al. | |
| 2015/0381598 A1* | 12/2015 | Koved | H04W 12/065 726/3 |
| 2016/0098548 A1* | 4/2016 | Vancini | G06F 21/45 726/4 |
| 2016/0127417 A1 | 5/2016 | Janssen | |
| 2016/0246989 A1 | 8/2016 | Roy et al. | |
| 2016/0283708 A1* | 9/2016 | Getchius | G06F 21/36 |
| 2017/0134434 A1* | 5/2017 | Allen | H04L 63/20 |

* cited by examiner

MONITORING AND PREVENTING UNAUTHORIZED DATA ACCESS

BACKGROUND

The present invention relates generally to transmission of data between users, and more particularly to preventing unauthorized data access.

SUMMARY

In one embodiment of the present invention, a method for preventing unauthorized access of confidential information comprises detecting a transmission of data from a first user to a second user. The method further comprises determining an authorization level corresponding to the second user based on a first role associated with the first user and a second role associated with the second user, a history of sensitive content received by the second user, analyzed network connection information corresponding to the second user, or any combination thereof. The method additionally comprises generating a probability that the authorization level corresponding to the second user and the data is accurate. Furthermore, the method comprises determining, based on the authorization level, that the data comprises sensitive information that the second user is not authorized to access. Additionally, the method comprises modifying the data by redacting the sensitive information from the data in response to the probability being within a range of a threshold value. In addition, the method comprises blocking transmission of the data in response to the probability being above the range.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

Users routinely transmit data within organizations and between different organizations. Additionally, the transmitted data can frequently include confidential or sensitive information such as medical information, financial information, personal information, and the like. In embodiments described herein, techniques can prevent unauthorized access of confidential information by monitoring data transmitted between users and modifying or blocking the data in some examples.

In some embodiments described herein, a device can detect a transmission of data from a first user to a second user. Additionally, the device can determine an authorization level corresponding to the second user. The device can also generate a probability that the authorization level corresponding to the second user and the data is accurate. Furthermore, the device can determine, based on the authorization level, that the data comprises sensitive information that the second user is not authorized to access. Moreover, the device can modify the data based on the probability, wherein the data is to be redacted if the probability is within a range of a threshold value or the data is to be blocked from transmission if the probability is above the range.

Accordingly, the techniques described herein can prevent unauthorized access to data based on an authorization level associated with each user transmitting data and receiving data. For example, the techniques described herein can prevent a user from receiving confidential information or a user from performing an unauthorized action with confidential information such as transmitting confidential information to an unauthorized user.

Figure 1:
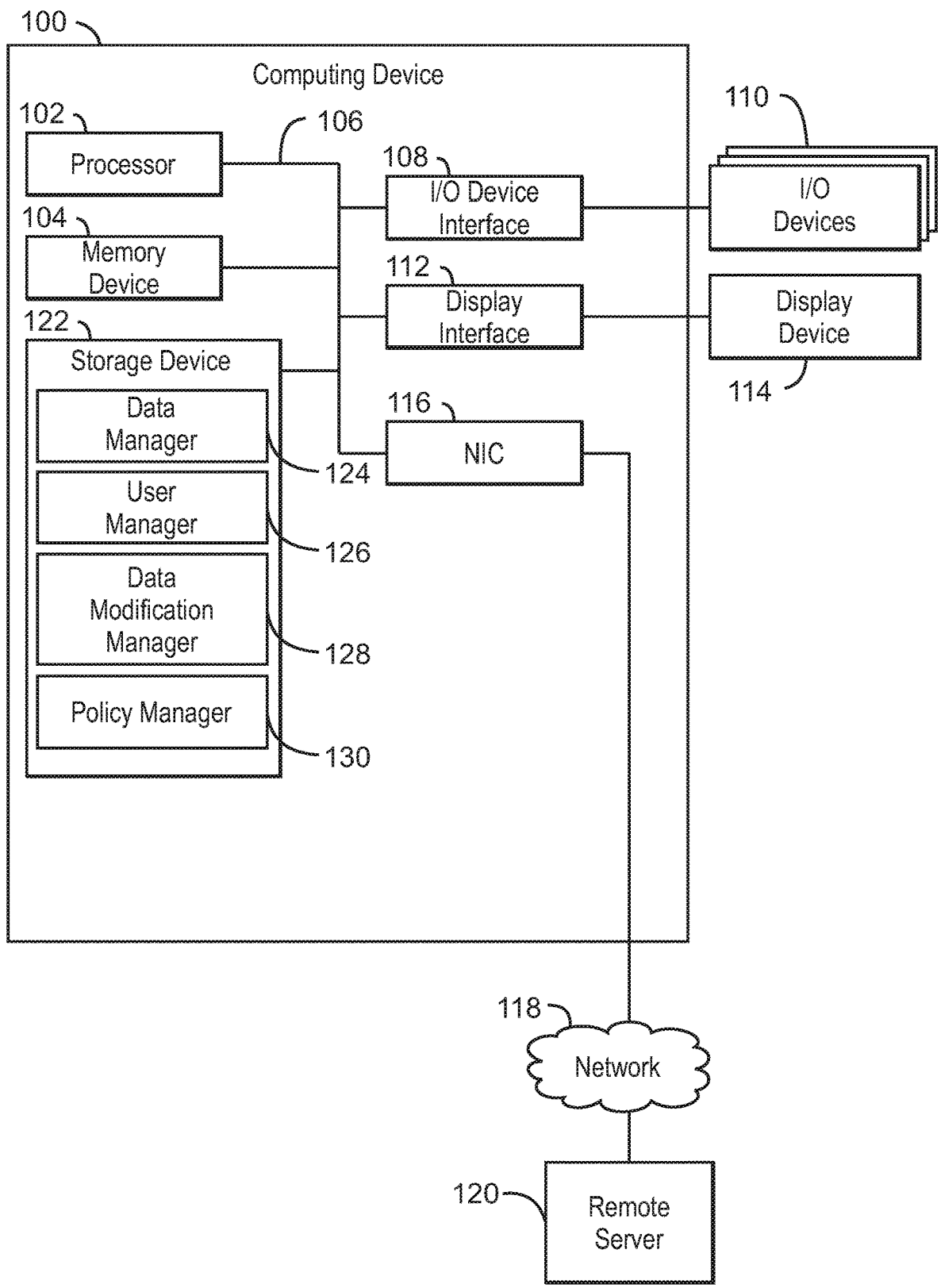
FIG. 1 depicts a block diagram of an example computing system that can prevent unauthorized access of confidential information according to an embodiment described herein.

With reference now to FIG. 1, an example computing device is depicted that can prevent unauthorized access of confidential information. The computing device 100 may be for example, a server, desktop computer, laptop computer, tablet computer, or smartphone. In some examples, computing device 100 may be a cloud computing node. Computing device 100 may be described in the general context of computer system executable instructions, such as program modules, being executed by a computer system. Generally, program modules may include routines, programs, objects, components, logic, data structures, and so on that perform particular tasks or implement particular abstract data types. Computing device 100 may be practiced in distributed cloud computing environments where tasks are performed by remote processing devices that are linked through a communications network. In a distributed cloud computing environment, program modules may be located in both local and remote computer system storage media including memory storage devices.

The computing device 100 may include a processor 102 that is adapted to execute stored instructions, a memory device 104 to provide temporary memory space for operations of said instructions during operation. The processor can be a single-core processor, multi-core processor, computing cluster, or any number of other configurations. The memory 104 can include random access memory (RAM), read only memory, flash memory, or any other suitable memory systems.

The processor 102 may be connected through a system interconnect 106 (e.g., PCI®, PCI-Express®, etc.) to an input/output (I/O) device interface 108 adapted to connect the computing device 100 to one or more I/O devices 110. The I/O devices 110 may include, for example, a keyboard and a pointing device, wherein the pointing device may include a touchpad or a touchscreen, among others. The I/O devices 110 may be built-in components of the computing device 100, or may be devices that are externally connected to the computing device 100.

The processor 102 may also be linked through the system interconnect 106 to a display interface 112 adapted to connect the computing device 100 to a display device 114. The display device 114 may include a display screen that is a built-in component of the computing device 100. The display device 114 may also include a computer monitor, television, or projector, among others, that is externally connected to the computing device 100. In addition, a network interface controller (NIC) 116 may be adapted to connect the computing device 100 through the system interconnect 106 to the network 118. In some embodiments, the NIC 116 can transmit data using any suitable interface or protocol, such as the internet small computer system interface, among others. The network 118 may be a cellular network, a radio network, a wide area network (WAN), a local area network (LAN), or the Internet, among others. A remote server 120 may connect to the computing device 100 through the network 118.

The processor 102 may also be linked through the system interconnect 106 to a storage device 122 that can include a hard drive, an optical drive, a USB flash drive, an array of drives, or any combinations thereof. In some examples, the storage device 122 may include a data manager 124, a user manager 126, a data modification manager 128, and a policy manager 130. In some embodiments, the data manager 124 can detect a transmission of data from a first user to a second user. In some embodiments, the user manager 126 can determine an authorization level corresponding to the second user. In some embodiments, the user manager 126 can also generate a probability that the authorization level corresponding to the second user and the data is accurate. In some examples, the user manager 126 can also determine, based on the authorization level, that the data comprises sensitive information that the second user is not authorized to access. Additionally, in some embodiments, the data modification manager 128 can modify the data based on the probability, wherein the data is to be redacted if the probability is within a range of a threshold value or the data is to be blocked from transmission if the probability is above the range. Furthermore, the policy manager 130 can transmit modified redacted data to the second user.

It is to be understood that the block diagram of FIG. 1 is not intended to indicate that the computing device 100 is to include all of the components shown in FIG. 1. Rather, the computing device 100 can include fewer or additional components not illustrated in FIG. 1 (e.g., additional memory components, embedded controllers, modules, additional network interfaces, etc.). Furthermore, any of the functionalities of the data manager 124, user manager 126, data modification manager 128, and policy manager 130 may be partially, or entirely, implemented in hardware and/or in the processor 102. For example, the functionality may be implemented with an application specific integrated circuit, logic implemented in an embedded controller, or in logic implemented in the processor 102, among others. In some embodiments, the functionalities of the data manager 124, user manager 126, data modification manager 128, and policy manager 130 can be implemented with logic, wherein the logic, as referred to herein, can include any suitable hardware (e.g., a processor, among others), software (e.g., an application, among others), firmware, or any suitable combination of hardware, software, and firmware.

Figure 2:
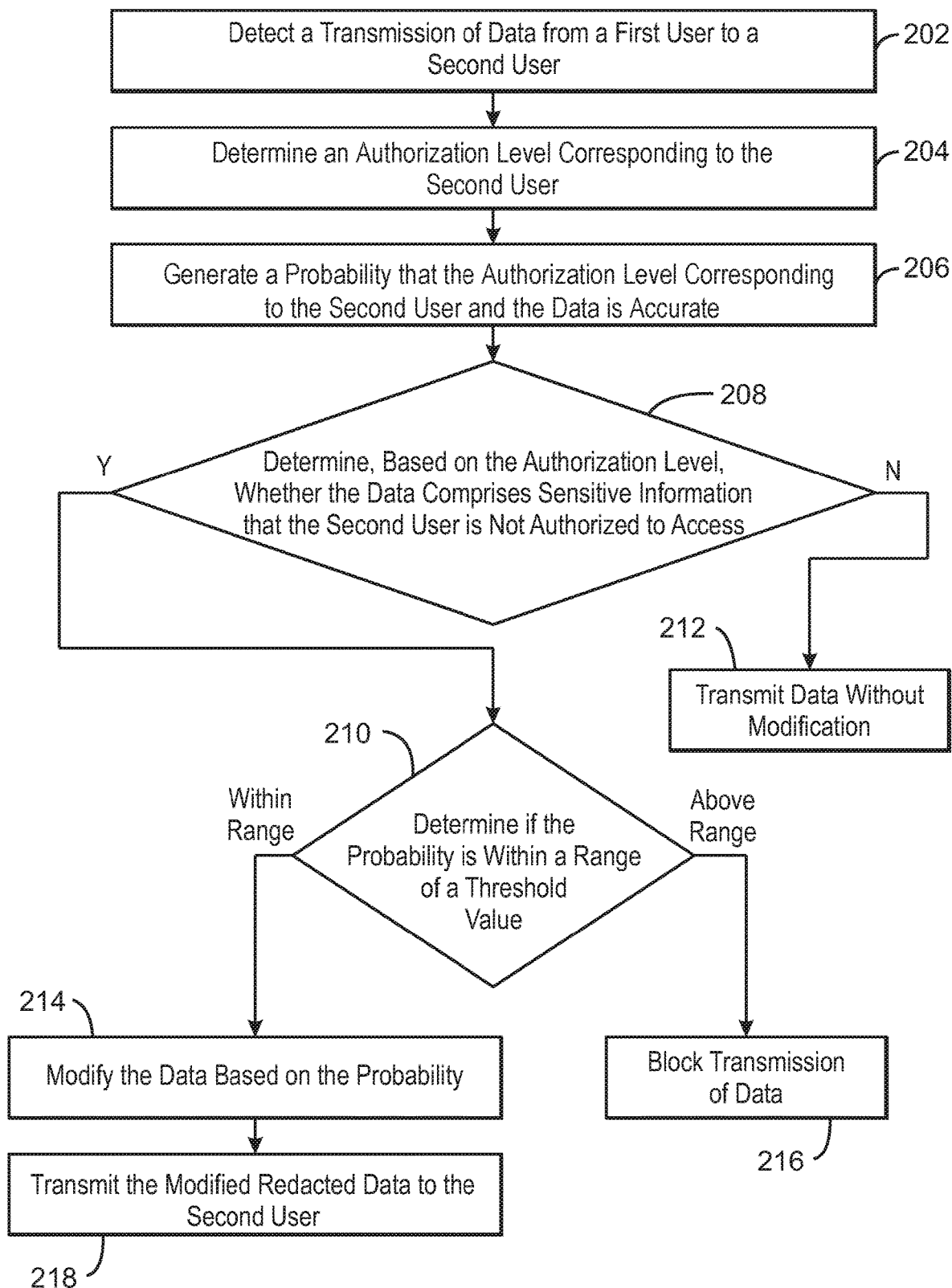
FIG. 2 is a process flow diagram of an example method that can prevent unauthorized access of confidential information according to an embodiment described herein.

FIG. 2 is a process flow diagram of an example method that can prevent unauthorized access of confidential information. The method 200 can be implemented with any suitable computing device, such as the computing device 100 of FIG. 1.

At block 202, a data manager 124 can detect a transmission of data from a first user to a second user. In some examples, the data can be transmitted between users with an email, a data packet based on any suitable network protocol, and the like. In some embodiments, the data manager 124 can detect the transmission of data between users from a web browser, an application installed within a web browser such as a browser add-on, or from a remote external server. For example, the data manager 124 can reside on a remote server that monitors and forwards data from a first user to a second user. In some examples, the remote server can be an email server, among others. In some embodiments, the data manager 124 can reside in any suitable application and can monitor transmitted data from a first user to any number of additional users. For example, the data manager 124 can detect a transmission of data from a first user to a separate set of users in an email, among others.

In some embodiments, the data manager 124 can hook into event calls or modify an operating system to detect a transmission of data from a first user to a second user. In some examples, the data manager 124 can monitor, at a kernel level of the operating system, a plurality of system calls involving locally stored data and files. In some embodiments, hooking into an event call can include inserting hooks into a process that enables an application or operating system to intercept functions calls, messages, or events, among others, passed between various software components. For example, hooking into an event call can enable an application or process to intercept keyboard or mouse event messages before the keyboard or mouse messages reach an application. In some embodiments, the data manager 124 can modify an operating system to load an additional library module or modify the import table of an executable, which can enable the data manager 124 to detect any data transmitted to an external or remote source. In some embodiments, the file manager 124 can modify a function associated with an application used to access the data, wherein the function comprises transmitting data to an external source via any suitable network protocol stack layer such as an application layer, transport layer, network layer, data link layer, or physical layer, among others.

At block 204, a user manager 126 can determine an authorization level corresponding to the second user. For example, the user manager 126 can detect any suitable number of characteristics associated with a user. In some examples, the user manager 126 uses a data structure, such as a binary tree, vector, linked list, array, and the like, to store characteristics for each user. In some embodiments, the characteristics for each user can include a hierarchical relationship within a set of users. For example, the characteristics can indicate a role of a user such as a general manager, a manager of a particular type of sensitive information, a user without managerial responsibilities, and the like. In some examples, the user manager 126 can determine the authorization level of each user for each type of sensitive information. For example, a user with a general manager role or characteristic may have an authorization level enabling the user to receive any type of sensitive information from other users with manager roles or users without managerial responsibilities. In some examples, a financial manager role can enable a user to receive finance related sensitive information from other users with manager roles or without managerial roles. However, a user with a financial manager role may not have an authorization level enabling access to medical information for other users. Similarly, a user with a medical manager role can receive medical related sensitive information from other users with manager roles or without managerial roles. However, a user with a medical manager role may not have an authorization level enabling access to financial or personal information for other users. In some embodiments, users can be arranged in a hierarchical manner in which each higher level role can access additional sensitive information that a lower level cannot access.

In some embodiments, the characteristics associated with each user can indicate whether a user has permission to access data from a particular local device or remote device that hosts the data, the file name corresponding to the data on the host device, a creation date of the data on the host device, a user or group of users with administrative access to the data on the host device, and the like. In some examples, the authorization level is based on a first role associated with the first user and a second role associated with the second user, a history of sensitive content received by the second user, analyzed network connection information corresponding to the second user, or any combination thereof. In some examples, the user manager 124 can retrieve the roles associated with the first user and the second user, the history of sensitive content received by the second user, and the analyzed network connection information corresponding to the second user from an external server. In some examples, a network can include a graph with nodes that correspond to workers and edges that indicate relationships between the workers. Accordingly, a network connection history can include modifications to a graph to indicate different relationships between workers.

In some embodiments, an authorization level corresponding to a second user receiving data is determined based on a third role corresponding to an additional set of users, wherein the third role is the same as a first role of a first user sending data or a second role of the second user. In some examples, the additional set of users share a common unit with the first user and the second user. For example, the common unit can include a common business unit, organization, network address, and the like.

At block 206, the user manager 126 can also generate a probability that the authorization level corresponding to the second user and the data is accurate. For example, the user manager 126 can use any suitable regular expression to detect keywords, phrases, or a combination thereof, which correspond to sensitive information. Sensitive information, as referred to herein, can include financial information, personal information, medical information, classified information, and the like. In some embodiments, the regular expressions can be predetermined or can be generated based on a set of data. For example, the user manager 126 can apply machine learning techniques to detect regular expressions that identify sensitive information. For example, a regular expression can identify sensitive information, such as a social security number, based on the following expression: "SSN ^(\d{3}-?\d{2}-?\d{4}|XXX-XX-XXXX)$". The probability can indicate a likelihood that this pattern corresponds to social security numbers or non-sensitive information. In some embodiments, the user manager 126 can generate the probability based on a likelihood that the results from the regular expression are accurate. For example, the user manager 126 can generate the probability with any suitable technique such as a Bayesian network, statistical data analysis, an unsupervised clustering technique, an artificial network, a deep learning technique, and the like. In some examples, the result is a first probability.

The user manager 126 can also generate a second probability. For example, the user manager 126 can determine a likelihood or probability that a second user with a corresponding second role will receive sensitive information from a first user role based on previous data transmitted between the first user and the second user. In some examples, the user manager 126 can calculate the probability that a second user is authorized to receive a type of sensitive information based on a number of times sensitive information has been transmitted between a first user role and a second user role, which can be divided by a number of times any type of sensitive information is transmitted between a first user role and a second user role. In some embodiments, the user manager 126 can determine if the result is above some threshold, which can indicate a second user is likely authorized to receive a type of sensitive information. The first probability of the likelihood that data includes a type of sensitive information can be combined with the second probability that a user with a second user role is authorized to view a type of sensitive information. In some embodiments, the results or output of the combination can indicate a likelihood or probability that the authorization level corresponding to the second user and the data is accurate.

At block 208, the user manager 126 can also determine whether, based on the authorization level, the data comprises sensitive information that the second user is not authorized to access. For example, as discussed above, a user may not have access to financial information, medical information, personal information, or any sensitive information. If the second user is not authorized to access the data, the process continues at block 210. If the second user is authorized to access the data, the process continues at block 212, in which the data is transmitted from the first user to the second user without modification.

At block 210, the data modification manager 128 can determine if the probability is within a range of a threshold value or above the range. For example, the threshold value, as referred to herein, can indicate whether the probability that a user cannot access sensitive information is accurate or inaccurate. For example, a high probability indicates that it is unlikely that a user can access sensitive information and that the data may be blocked from transmission. Conversely, a low probability indicates that it is very likely that a user can access sensitive information. However, a range of values including the threshold value may indicate that it is unclear if a user can access sensitive information. In some embodiments, the probability is compared to a predefined value (i.e. the threshold that the user should not access the data). For example, a probability value between 0-10% can result in data being transmitted, a probability value between 11-20% can result in data being redacted, and a probability value above 20% can result in a transmission of data being blocked. If the probability is within a range of a threshold value, the process continues at block 214. If the probability is above the range of the threshold value, the process continues at block 216.

At block 216, the data modification manager 128 can block the transmission of data if the probability is above the range. For example, the data modification manager 128 can determine that the probability indicates that a user is likely unable to access a type of sensitive information. Accordingly, the data modification manager 128 can prevent transmission of data including the sensitive information to a second user from a first user.

If the probability is within a range of a threshold value, at block 214, the data modification manager 128 can modify the data based on the probability. For example, the data modification manager 128 can redact sensitive information from the data if the probability is within a range of a threshold value. In some examples, the data modification manager 128 can mask the sensitive information by replacing the sensitive information with pseudorandom alphanumeric characters.

At block 218, the policy manager 130 can transmit the modified redacted data to the second user. In some embodiments, the policy manager 130 can block a system call to access transmitted data including sensitive information in response to detecting a second user who is to receive the data is unauthorized. In some embodiments, the policy manager 130 can generate and transmit an alert or email to a user with a higher role or higher hierarchical level indicating the attempted transmission of sensitive information to an unauthorized second user. In some embodiments, the policy manager 130 can prevent a first user from accessing additional sensitive information following an attempt by the first user to transmit sensitive information to an unauthorized second user.

The process flow diagram of FIG. 2 is not intended to indicate that the operations of the method 200 are to be executed in any particular order, or that all of the operations of the method 200 are to be included in every case. For example, the method 200 can include generating a message corresponding to an alert and transmitting the message to a predetermined third user in response to the second user overriding the alert. In some embodiments, the method 200 can also include detecting a third user is associated with the type of sensitive information being transmitted and providing contact information for the third user to the first user. For example, the data manager 126 may determine that a role of a second user has changed and that the role has been assigned to a third user.

In some embodiments, the method 200 can also include detecting that the second user has received unauthorized sensitive information from a set of users including the first user and transmitting a verification request regarding the second user to an external server, wherein the verification request comprises an indication of a role modification of the second user. Additionally, the method 200 can include modifying a stored role of the second user based on the verification request, wherein the modified stored role enables the second user to view the sensitive information. In some embodiments, the method 200 can include transmitting a verification request regarding the second user to an external server, wherein the verification request comprises an indication of a role modification of the second user. The method 200 can also include modifying a stored role of the second user based on the verification request, wherein the second user is restricted from viewing at least one type of sensitive information. In some embodiments, the method 200 can include querying a current lightweight directory access protocol (LDAP) system and modifying a user permissions setting based on a modified role either restricting access to sensitive information or providing access to additional sensitive information.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 3:
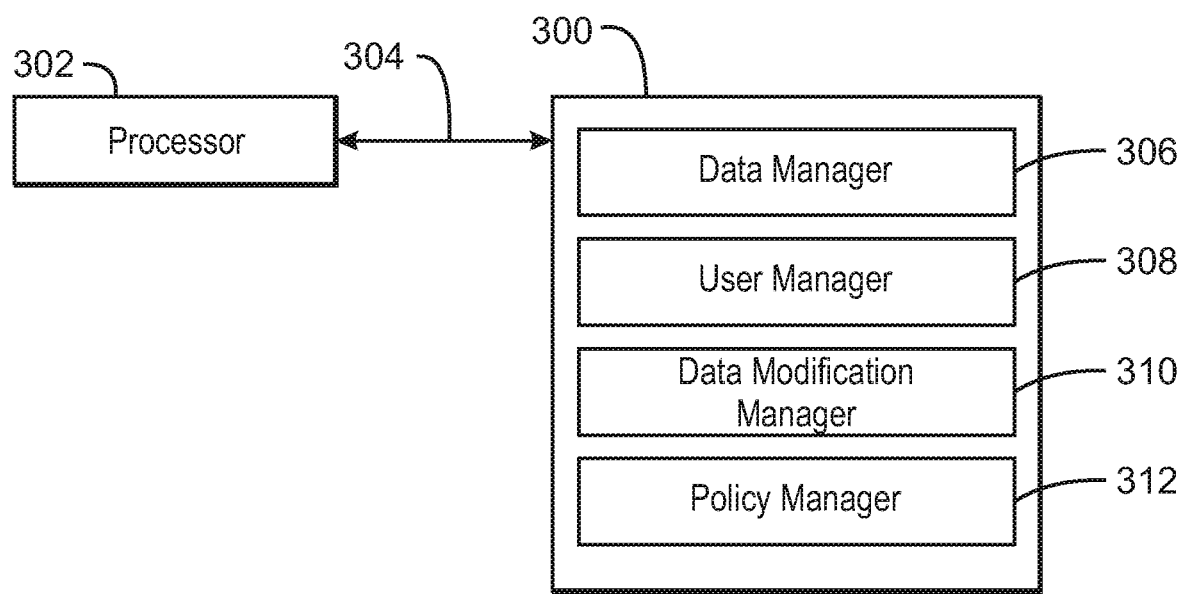
FIG. 3 is a tangible, non-transitory computer-readable medium that can prevent unauthorized access of confidential information according to an embodiment described herein.

Referring now to FIG. 3, a block diagram is depicted of an example of a tangible, non-transitory computer-readable medium that can prevent unauthorized access of confidential information. The tangible, non-transitory, computer-readable medium 300 may be accessed by a processor 302 over a computer interconnect 304.

Furthermore, the tangible, non-transitory, computer-readable medium 300 may include code to direct the processor 302 to perform the operations of the current method. For example, a data manager 306 can detect a transmission of data from a first user to a second user. In some embodiments, a user manager 308 can determine an authorization level corresponding to the second user. In some embodiments, the user manager 308 can also generate a probability that the authorization level corresponding to the second user and the data is accurate. In some examples, the user manager 308 can also determine, based on the authorization level, that the data comprises sensitive information that the second user is not authorized to access. Additionally, in some embodiments, a data modification manager 310 can modify the data based on the probability, wherein the data is to be redacted if the probability is within a range of a threshold value or the data is to be blocked from transmission if the probability is above the range. Furthermore, a policy manager 312 can transmit modified redacted data to the second user.

It is to be understood that any number of additional software components not shown in FIG. 3 may be included within the tangible, non-transitory, computer-readable medium 300, depending on the specific application. Furthermore, fewer software components than those shown in FIG. 3 can be included in the tangible, non-transitory, computer-readable medium 300.

Figure 4:
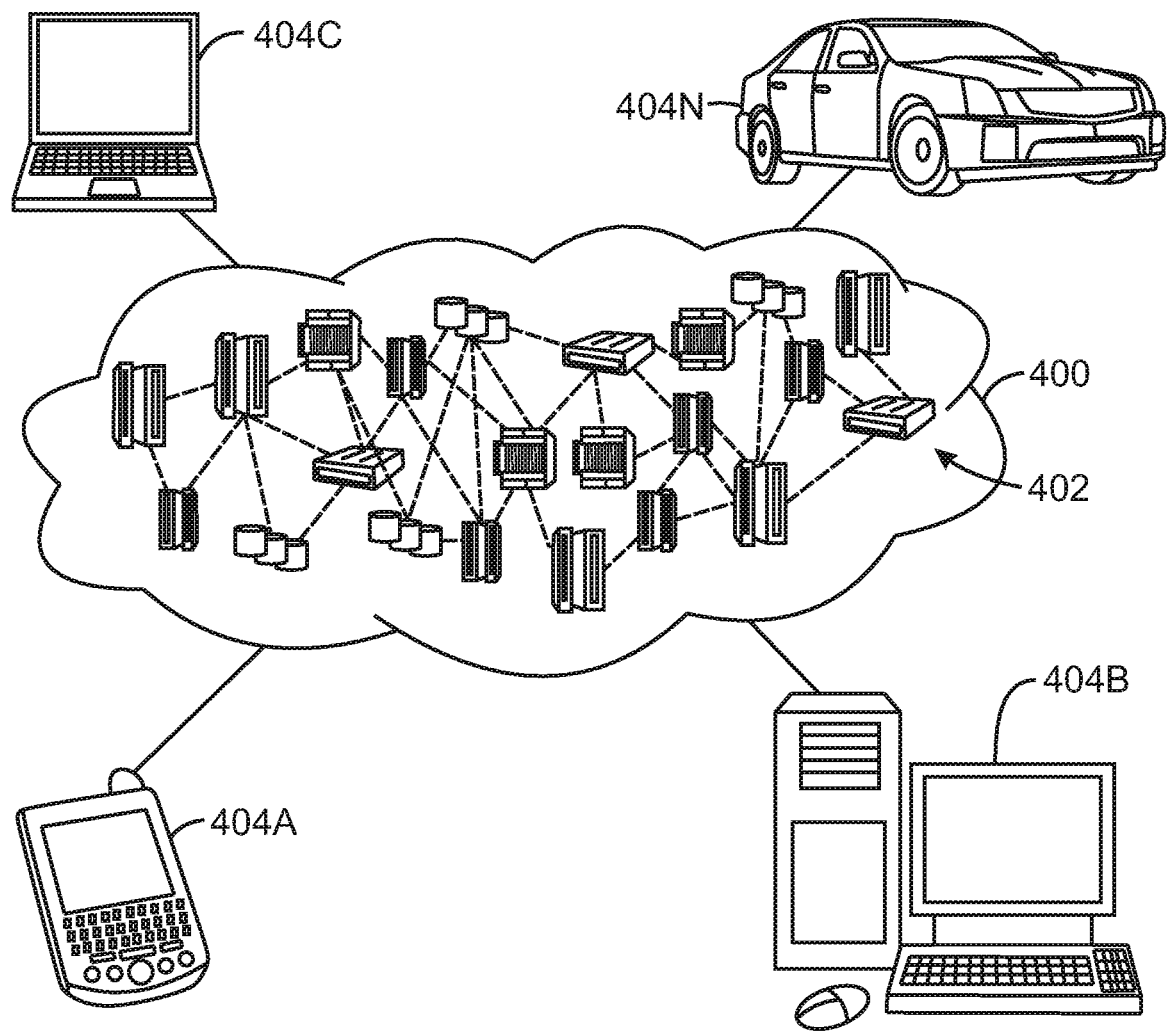
FIG. 4 depicts an illustrative cloud computing environment according to an embodiment described herein.

Referring now to FIG. 4, illustrative cloud computing environment 400 is depicted. As shown, cloud computing environment 400 comprises one or more cloud computing nodes 402 with which local computing devices used by cloud consumers, such as, for example, personal digital assistant (PDA) or cellular telephone 404A, desktop computer 404B, laptop computer 404C, and/or automobile computer system 404N may communicate. Nodes 402 may communicate with one another. They may be grouped (not shown) physically or virtually, in one or more networks, such as Private, Community, Public, or Hybrid clouds as described hereinabove, or a combination thereof. This allows cloud computing environment 400 to offer infrastructure, platforms and/or software as services for which a cloud consumer does not need to maintain resources on a local computing device. It is understood that the types of computing devices 404A-N shown in FIG. 4 are intended to be illustrative only and that computing nodes 402 and cloud computing environment 400 can communicate with any type of computerized device over any type of network and/or network addressable connection (e.g., using a web browser).

Figure 5:
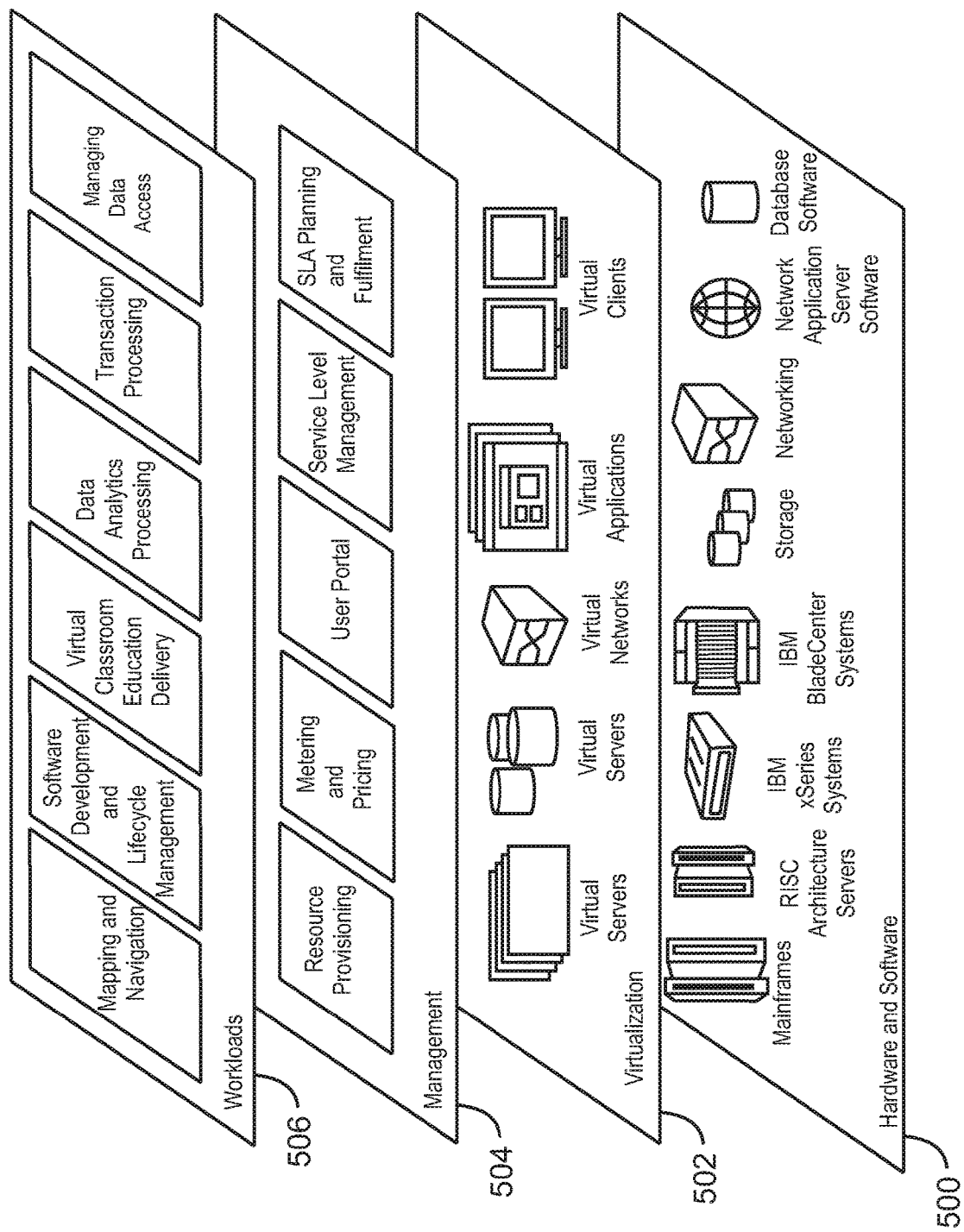
FIG. 5 depicts a set of functional abstraction layers provided by a cloud computing environment according to an embodiment described herein.

Referring now to FIG. 5, a set of functional abstraction layers provided by cloud computing environment 400 (FIG. 4) is shown. It should be understood in advance that the components, layers, and functions shown in FIG. 5 are intended to be illustrative only and embodiments of the invention are not limited thereto. As depicted, the following layers and corresponding functions are provided.

Hardware and software layer 500 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM Web Sphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 502 provides an abstraction layer from which the following examples of virtual entities may be provided: virtual servers; virtual storage; virtual networks, including virtual private networks; virtual applications and operating systems; and virtual clients. In one example, management layer 504 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 506 provides examples of functionality for which the cloud computing environment may be utilized. Examples of workloads and functions which may be provided from this layer include: mapping and navigation; software development and lifecycle management; virtual classroom education delivery; data analytics processing; transaction processing; and preventing unauthorized access of confidential information.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for preventing unauthorized access of confidential information, the method comprising:
    detecting, by a data manager executing on a computing device, a transmission of data from a first user to a second user, wherein the data comprises an email or a data packet based on a network protocol;
    determining, by a user manager executing on the computing device, an authorization level corresponding to the second user based on a first role associated with the first user and a second role associated with the second user, a history of sensitive content received by the second user, analyzed network connection information corresponding to the second user, or any combination thereof;
    generating, by the user manager, a probability that the authorization level corresponding to the second user and the data is accurate;
    determining, by the user manager, based on the authorization level, that the data comprises sensitive information that the second user is not authorized to access;
    modifying, by a data modification manager executing on the computing device, the data by redacting the sensitive information from the data in response to the probability being within a range of a threshold value; and
    blocking, by the data modification manager, transmission of the data in response to the probability being above the range.

2. The method as recited in claim 1 further comprising:
    modifying the data via a web browser or an external server residing between the first user and the second user.

3. The method as recited in claim 1 further comprising:
    generating an alert based on the modified data, wherein the alert indicates that the second user is not authorized to access the data.

4. The method as recited in claim 3 further comprising:
    generating a message corresponding to the alert; and
    transmitting the message to a predetermined third user in response to the second user overriding the alert.

5. The method as recited in claim 1 further comprising:
    detecting a third user associated with a type of the sensitive information; and
    providing contact information for the third user to the first user.

6. The method as recited in claim 1 further comprising:
    detecting that the second user has received unauthorized sensitive information from a set of users including the first user;
    transmitting a verification request regarding the second user to an external server, wherein the verification request comprises an indication of a role modification of the second user; and
    modifying a stored role of the second user based on the verification request, wherein the modified stored role enables the second user to view the sensitive information.

7. The method as recited in claim 1, wherein the authorization level corresponding to the second user is determined based on a third role corresponding to an additional set of users, wherein the third role is the same as the first role or the second role.

8. A computer program product for preventing unauthorized access of confidential information, the computer program product comprising a computer readable storage medium having program code embodied therewith, the program code comprising the programming instructions for:
    detecting, by a data manager executing on a computing device, a transmission of data from a first user to a second user, wherein the data comprises an email or a data packet based on a network protocol;
    determining, by a user manager executing on the computing device, an authorization level corresponding to the second user based on a first role associated with the first user and a second role associated with the second user, a history of sensitive content received by the second user, analyzed network connection information corresponding to the second user, or any combination thereof;
    generating, by the user manager, a probability that the authorization level corresponding to the second user and the data is accurate;
    determining, by the user manager, based on the authorization level, that the data comprises sensitive information that the second user is not authorized to access;
    modifying, by a data modification manager executing on the computing device, the data by redacting the sensitive information from the data in response to the probability being within a range of a threshold value; and
    blocking, by the data modification manager, transmission of the data in response to the probability being above the range.

9. The computer program product as recited in claim 8, wherein the program code further comprises the programming instructions for:
    modifying the data via a web browser or an external server residing between the first user and the second user.

10. The computer program product as recited in claim 8, wherein the program code further comprises the programming instructions for:
   generating an alert based on the modified data, wherein the alert indicates that the second user is not authorized to access the data.

11. The computer program product as recited in claim 10, wherein the program code further comprises the programming instructions for:
   generating a message corresponding to the alert; and
   transmitting the message to a predetermined third user in response to the second user overriding the alert.

12. The computer program product as recited in claim 8, wherein the program code further comprises the programming instructions for:
   detecting a third user associated with a type of the sensitive information; and
   providing contact information for the third user to the first user.

13. The computer program product as recited in claim 8, wherein the program code further comprises the programming instructions for:
   detecting that the second user has received unauthorized sensitive information from a set of users including the first user;
   transmitting a verification request regarding the second user to an external server, wherein the verification request comprises an indication of a role modification of the second user; and
   modifying a stored role of the second user based on the verification request, wherein the modified stored role enables the second user to view the sensitive information.

14. The computer program product as recited in claim 8, wherein the authorization level corresponding to the second user is determined based on a third role corresponding to an additional set of users, wherein the third role is the same as the first role or the second role.

15. A computing device, comprising:
   a memory for storing a computer program for preventing unauthorized access of confidential information; and
   a processor connected to the memory, wherein the processor is configured to execute the program instructions of the computer program comprising:
      detecting, by a data manager executing on the computing device, a transmission of data from a first user to a second user, wherein the data comprises an email or a data packet based on a network protocol;
      determining, by a user manager executing on the computing device, an authorization level corresponding to the second user based on a first role associated with the first user and a second role associated with the second user, a history of sensitive content received by the second user, analyzed network connection information corresponding to the second user, or any combination thereof;
      generating, by the user manager, a probability that the authorization level corresponding to the second user and the data is accurate;
      determining, by the user manager, based on the authorization level, that the data comprises sensitive information that the second user is not authorized to access;
      modifying, by a data modification manager executing on the computing device, the data by redacting the sensitive information from the data in response to the probability being within a range of a threshold value; and
      blocking, by the data modification manager, transmission of the data in response to the probability being above the range.

16. The computing device as recited in claim 15, wherein the program instructions of the computer program further comprise:
   modifying the data via a web browser or an external server residing between the first user and the second user.

17. The computing device as recited in claim 15, wherein the program instructions of the computer program further comprise:
   generating an alert based on the modified data, wherein the alert indicates that the second user is not authorized to access the data.

18. The computing device as recited in claim 17, wherein the program instructions of the computer program further comprise:
   generating a message corresponding to the alert; and
   transmitting the message to a predetermined third user in response to the second user overriding the alert.

19. The computing device as recited in claim 15, wherein the program instructions of the computer program further comprise:
   detecting a third user associated with a type of the sensitive information; and providing contact information for the third user to the first user.

20. The computing device as recited in claim 15, wherein the program instructions of the computer program further comprise:
   detecting that the second user has received unauthorized sensitive information from a set of users including the first user;
   transmitting a verification request regarding the second user to an external server, wherein the verification request comprises an indication of a role modification of the second user; and
   modifying a stored role of the second user based on the verification request, wherein the modified stored role enables the second user to view the sensitive information.

\* \* \* \* \*